Patented Jan. 30, 1923.

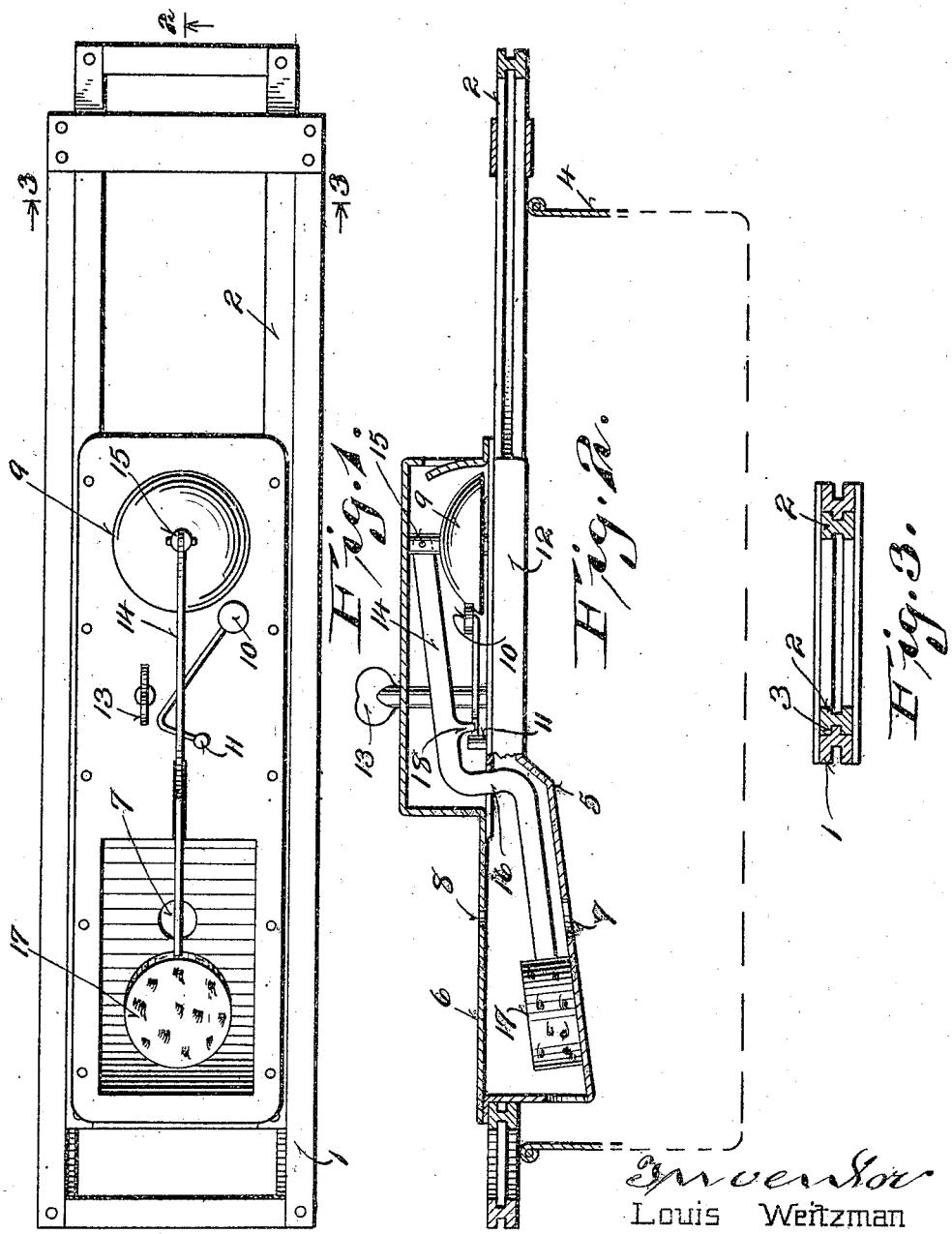

1,443,402

UNITED STATES PATENT OFFICE.

LOUIS WEITZMAN, OF MILWAUKEE, WISCONSIN.

SIGNAL FOR REFRIGERATOR PANS.

Application filed August 10, 1921. Serial No. 491,306.

*To all whom it may concern:*

Be it known that I, LOUIS WEITZMAN, a citizen of Russia, and resident of Milwaukee, in the county of Milwaukee and State of Wisconsin, have invented certain new and useful Improvements in Signals for Refrigerator Pans; and I do hereby declare that the following is a full, clear, and exact description thereof.

My invention relates to a new and improved signal which is adapted to be used in connection with refrigerator pans, such as are used to catch the drainage from the melting ice.

These pans are generally of small size and must be frequently emptied in order to prevent the same from overflowing. This is frequently forgotten with the result that the pan overflows and causes considerable damage, especially when the refrigerator is located on one of the upper floors of the building, due to the leakage of the water through the ceiling of the room below.

The general object of the invention is to provide means which may be readily applied to the pan and which will automatically give an alarm to notify the occupant that the pan requires emptying.

A further object of the invention is to provide a device of this kind which may be easily adjusted to accommodate it to a pan of any size which is likely to be used.

A device which comprises my invention is illustrated in the accompanying drawing, in which:—

Figure 1 is a plan view of the invention with the cover removed.

Figure 2 is a longitudinal sectional view thereof on the line 2—2 of Figure 1.

Figure 3 is a cross sectional view on the line 3—3 of Figure 1.

The device includes a pair of sliding frames 1 and 2 which may be connected in any suitable manner such as the tongue and groove connection shown at 3. This permits the frames to be adjusted to accommodate the device to the size of the pan 4 on which it is to be placed. One of the frames is provided with a housing 5 which is provided with a suitable cover 6. The housing is provided with suitable openings 7 to permit the water to flow into the same and the cover is provided with an air opening 8. A bell 9 is suitably supported within the housing and a hammer 10 is pivotally mounted at 11 to cooperate therewith. The usual alarm operating mechanism is provided in the portion 12 of the housing and may be wound by means of a key 13. An arm 14 is pivoted at 15 and is offset at 16 so that the outer end extends into the interior of the pan 4 and is provided with a float 17 of cork or other suitable material. A finger 18 is formed on the arm and normally extends into the path of the arm which carries the hammer 10 and prevents it from operating. It will readily be seen however that when the water in the pan rises so as to be in danger of overflowing the float 17 will rise and cause the finger 18 to release the hammer so as to give the alarm.

I claim as my invention:—

1. A device of the character described comprising a support, an alarm mounted thereon and including a bell, a pivoted hammer for striking the bell, and means for operating the same, said support comprising two members slidable with respect to each other to adapt the same to span pans of different sizes, an arm pivoted to the support and having a finger normally extending into the path of the hammer to prevent the operation thereof, the end of said arm being extended into the pan and having a float operable when the pan is filled with liquid to a predetermined level to raise the arm and finger and release the hammer.

2. An alarm for refrigerator pans, said alarm comprising a bell, clock mechanism for said bell, a housing for said bell and mechanism, a float, an arm attached to said float and having a portion cooperating with said clock mechanism to control said mechanism, and a perforated housing extending downwardly and adapted to occupy a position within said pan and to support said float when it is in its lowest position.

In testimony that I claim the foregoing I have hereunto set my hand at Milwaukee, in the county of Milwaukee and State of Wisconsin.

LOUIS WEITZMAN.